US007122792B2

(12) United States Patent
Chen et al.

(10) Patent No.: US 7,122,792 B2

(45) Date of Patent: Oct. 17, 2006

(54) METAL OXIDE-ASSISTED LASER DESORPTION/IONIZATION MASS SPECTROMETRY

(75) Inventors: Yu-Chie Chen, Hsinchu (TW); Cheng-Tai Chen, Zhongli (TW); Ya-Shiuan Lin, Daliao (TW)

(73) Assignee: National Chiao Tung University, Hsinchu (TW)

( * ) Notice: Subject to any disclaimer, the term of this patent is extended or adjusted under 35 U.S.C. 154(b) by 0 days.

(21) Appl. No.: 11/172,554

(22) Filed: Jun. 30, 2005

(65) Prior Publication Data

US 2006/0145068 A1 Jul. 6, 2006

(30) Foreign Application Priority Data

Dec. 30, 2004 (TW) .............................. 93141290 A

(51) Int. Cl.
*H01J 49/00* (2006.01)
*B01D 59/44* (2006.01)

(52) U.S. Cl. .................... 250/288; 250/281; 250/493.1

(58) Field of Classification Search ..................... None
See application file for complete search history.

(56) References Cited

OTHER PUBLICATIONS

Koichi Tanaka, Yutaka Ido, et al. "Detection of High Mass Molecules by Laser Desorption Time-of-Flight Mass Spectrometry," (1987) Central Research Lab., Shimadzu Corp., Kyoto, Japan (pp. 185-188).

Jan Sunner, Edward Dratz, et al. "Graphite Surface-Assisted Laser Desorption/Ionization Time-of-Flight Mass Spectrometry of Peptides and Proteins from Liquid Solutions," (1995) Dept. of Chem. and Biochem., Montana State Univ., Bozeman Montana, USA (pp. 4335-4342).

Jing Wei, Jillian M. Burial, et al. "Desorption-Ionization Mass Spectrometry on Porous Silicon" (1999) Dept. of Chem., Purdue Univ., West Lafayette, IN, USA (pp. 243-246).

*Primary Examiner*—Nikita Wells
(74) *Attorney, Agent, or Firm*—Bucknam and Archer

(57) ABSTRACT

The invention provides a simple, rapid and cost-effective metal oxide-assisted laser desorption/ionization mass spectrometry (MOALDI MS) without the addition of light-absorbing organic-matrix, comprising the use of (a) an inorganic metal oxide with light absorbing capability as an assisting material to render desorption/ionization of samples in laser desorption/ionization mass spectrometry and (b) a citric acid buffer as the proton source for enhancing the ionization efficiency for analytes. Metal oxide assisting materials is not only restricted to the uses of films. Metal oxide nanoparticles are also suitable to be used as the assisting materials. Low matrix background, stable surface feature, homogeneous sample deposition, and wide detectable mass range are the merits of MOALDI MS.

8 Claims, 7 Drawing Sheets

METAL OXIDE-ASSISTED LASER DESORPTION/IONIZATION MASS SPECTROMETRY

FIELD OF THE INVENTION

This invention present a novel laser desorption mass spectrometry (LD MS) by using metal oxide substrates as the assisting materials to facilitate desorption/ionization of analytes in LDI MS.

BACKGROUND OF THE INVENTION

Mass Spectrometry (MS) is a powerful analytical-tool that can provide the information about molecular weights and chemical structures for analytes. Charged gaseous ions are generally generated in an ionization source and subsequently distinguished based on their mass-to-charge ratios in a mass analyzer operated by an electric or magnetic filed.

Both matrix-assisted laser desorption/ionization (MALDI) and electrospray ionization (ESI) mass spectrometry, which have high sensitivity and wide mass range, are generally used for the analysis of high-polarity and high molecular-weight of analytes. The detectable mass range is up to several hundred thousand Daltons with the detection limit in the low fmol ($10^{-15}$ mole) to amole range. Therefore, both mass spectrometries have been widely used in the research for life science and proteomics.

MALDI mass spectrometry, which is different from direct LDI MS, requires small organic molecules used as a matrix having the capacity to absorb the laser energy to assist laser desorption/ionization of samples. Therefore, the detectable mass range is extended to a higher mass than that in direct LDI MS. The MALDI results are mainly determined by the selection of matrices. However, high matrix background appearing in the MALDI mass spectra, the requirement of co-crystallization of analytes with matrices, and analyte signals only found in "sweet spots" all arise as conventional MALDI matrices are used for MALDI MS analysis.

Using inorganic materials as the assisting substrate in MALDI MS analysis can avoid some problems arising as conventional matrices are used. Tanaka et al. are the pioneers, who used inorganic material mixing with glycerol as the matrix. They employed cobalt powder (~30 nm) mixing with glycerol as the assisting matrix in MALDI MS analysis for protein analyses. Later on, Sunneret al. alternatively used micro-sized graphite powder mixing with glycerol as the matrix. They also termed this approach as surface-assisted laser desorption/Ionization mass spectrometry (SALDI MS). Graphite powder is proposed as the energy transfer medium during SALDI MS processes.

A remarkable progress in the development of inorganic material-assisted laser desorption/ionization, which is called desorption/ionization on silicon (DIOS), was made by Siuzdaket al. in 1999. DIOS is a matrix-free method, which uses a porous silicon film capable of absorbing the laser energy as the sample deposition film. The porous silicon substrate is facilitated by treating the silicon surfaces electrochemically and mass analysis using silicon films that are formed from a silicon surface by plasma-enhanced chemical vapor deposition, have been applied successfully to the analysis of small molecules However, the surfaces of the porous silicon substrates are easily oxidized, which may lead the substrates become ineffective. The unstable feature of the porous silicon film may cause problem in storage and in practical uses. In addition, the fabricaton of the porous silicon substrates required particular equipments for production of porous surfaces though some commercialized products are already available. Generally, the upper detectable mass range is ca. 6 kDa. A laser desorption/ionization mass spectrometry using a stable assisting material with the advantages of low matrix background, ease of sample preparation, homogeneous sample deposition, stable substrate surface, and wide detectable mass range should be desirable.

SUMMARY OF THE INVENTION

A novel approach named as metal oxide-assisted laser desorption/ionization (MOALDI) mass spectrometry by using metal oxide as the assisting material is developed by the inventors. MOALDI is a matrix-free method, which employs metal oxide film or metal oxide nanoparticles as the assisting materials in LDI MS. That is, the sample can simply deposited on the surfaces of the metal-oxide films or nanoparticles for direct laser desorption mass spectrometric analysis. Additionally, low matrix background, ease of sample preparation, and homogeneous sample deposition are achieved in MOLADI MS analysis. Furthermore, the upper mass range is extended to ca. 24 kDa.

Metal oxides such as $TiO_2$, ZnO, $SnO_2$, $ZrO_2$, which are capable of absorbing laser energy, are the assisting materials used for MOALDI MS analysis. Among these metal oxides, titanium dioxide has the best performance in terms of chemical stability and ease of fabrication. Titanium dioxide substrate can be easily generated via sol-gel reactions. Titanium dioxide has been extensively used as photocatalytic materials and employed in the semiconductor industry in recent years. Titanium dioxide has three types of crystal structures, i.e. anatase, rutile, and brookite. Only titanium dioxide with anatase framework has photocatalytic property. Thus, anatase titania is used for the assisting material in MOALDI MS analysis when the the wavelength of the equipped laser is at 337 nm. Additionally, polyethylene glycol (PEG) was added into titania sol during sol-gel reactions to enlarge the pore sizes on the surfaces of titania substrates. Titania film with enlarged pore sizes used as the assisting material can perform lower detection limits and extend the mass range in MOALDI MS analysis. Titanium dioxide film is preferred to be fabricated on the surfaces of electric conductive substrates such as on an aluminum plate. The background ions generated from the surface of the titanium dioxide substrate is quit few. For example, there is no background ion appearing in the MOALDI mass spectrum when a surfactant mixture (~70 fmol) is used as the sample. However, for analytes such as peptides, citric buffer is added into the sample solution to provide the proton source, and it also can reduce the alkali cation adducts of analytes. Therefore, the MOALDI mass spectra are generally dominated by the protonated pseudomolecular ion ($MH^+$). The detection limit for peptides is in the low fmol to sub-fmol range.

The detectable mass range in MOALDI MS is superior to that in DIOS. Furthermore, either metal oxide film or nanoparticles are suitable to be used as the assisting material in MOALDI MS. Thus, MOALDI MS analysis can be applied to more dynamic research directions such as to nanotechnology research.

BRIEF DESCRIPTION OF THE DRAWINGS

In the drawings forming a part of this disclosure.

DETAILED DESCRIPTION OF THE INVENTION

Figure 1:
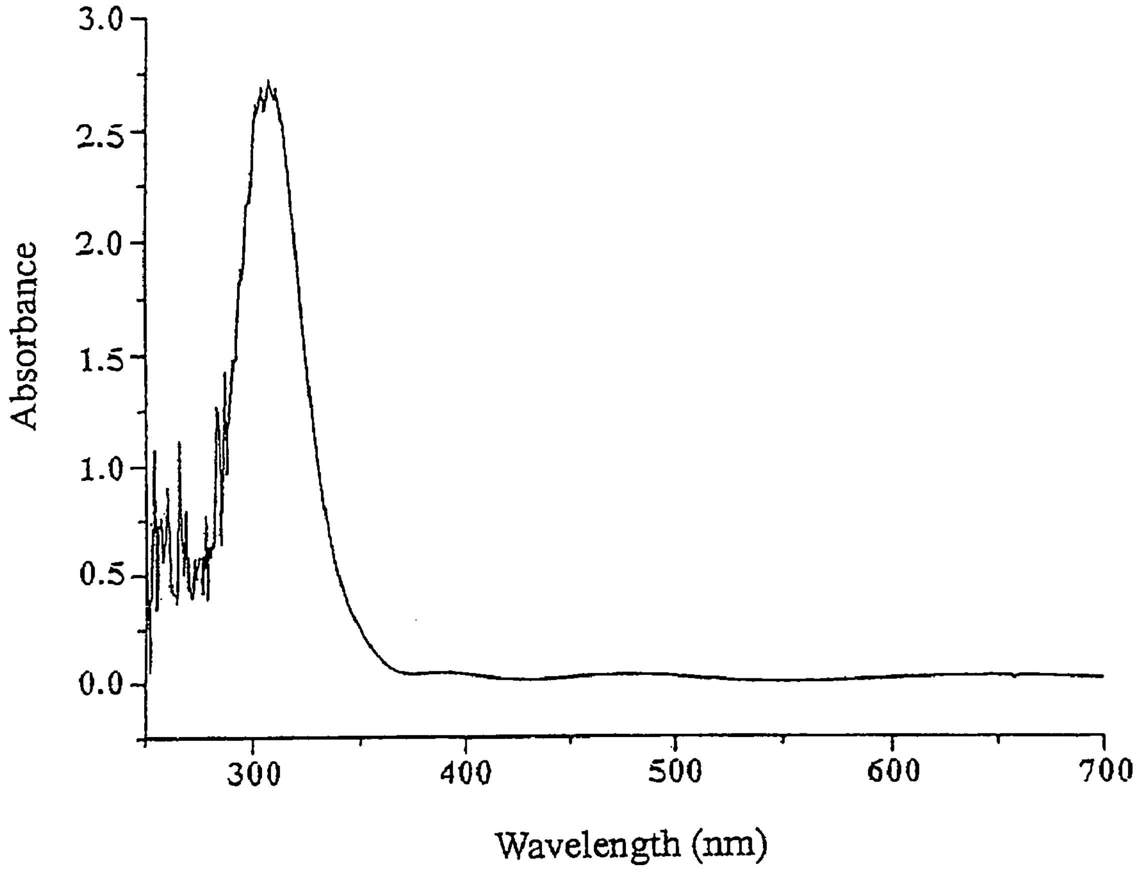
FIG. 1 displays the UV absorption spectrum of the titania sol-gel-deposited thin film on a glass slide, which was generated by doping polyethylene glycol ($MW_{ave}$=600) in titania sols during a sol-gel reaction followed by heat-treatment. The film is used for sample deposition. The film preparation is discussed in Example 1.

The present invention is further described in detail by following examples and embodiments, however, the present invention is not restricted by thereof.

EXAMPLE 1

Preparation of Titania Thin Films.

Titania sol was prepared by stirring titanium (IV) n-butoxide (3.4 mL) and ethanol (1.6 mL) for 30 min at room temperature (ca. 27° C.). A solution of ethanol (1.6 mL), water (0.18 mL), and 60% nitric acid (75 L) was then added slowly into the titanium (IV) n-butoxide/ethanol solution, which was stirred for an additional 10 min in an ice bath. Polyethylene glycol ($MW_{ave}$=600, 15 g) was added into the mixture and stirred for ca. 30 min. An aluminum sheet (2 cm×2 cm×0.2 mm) was used as the support for the titania sol coating. The aluminum support was pretreated by soaking it in acetone and then in methanol for 5 min in a sonicator to remove impurities. The titania sol solution was spin-coated onto the surface of the aluminum support (or a glass slide) using a spin coater. The titania sol solution was applied slowly to the aluminum sheet during the spin coating process. The modified aluminum sheet, coated with a thin film of titania, was aged for 20 min at room temperature. This titania chip was calcinated at 500° C. for 1 h. The titania chip was stored in a desiccator before use. The thickness of the film was ca. 390 nm measured by using an electron microscope.

Figure 2:
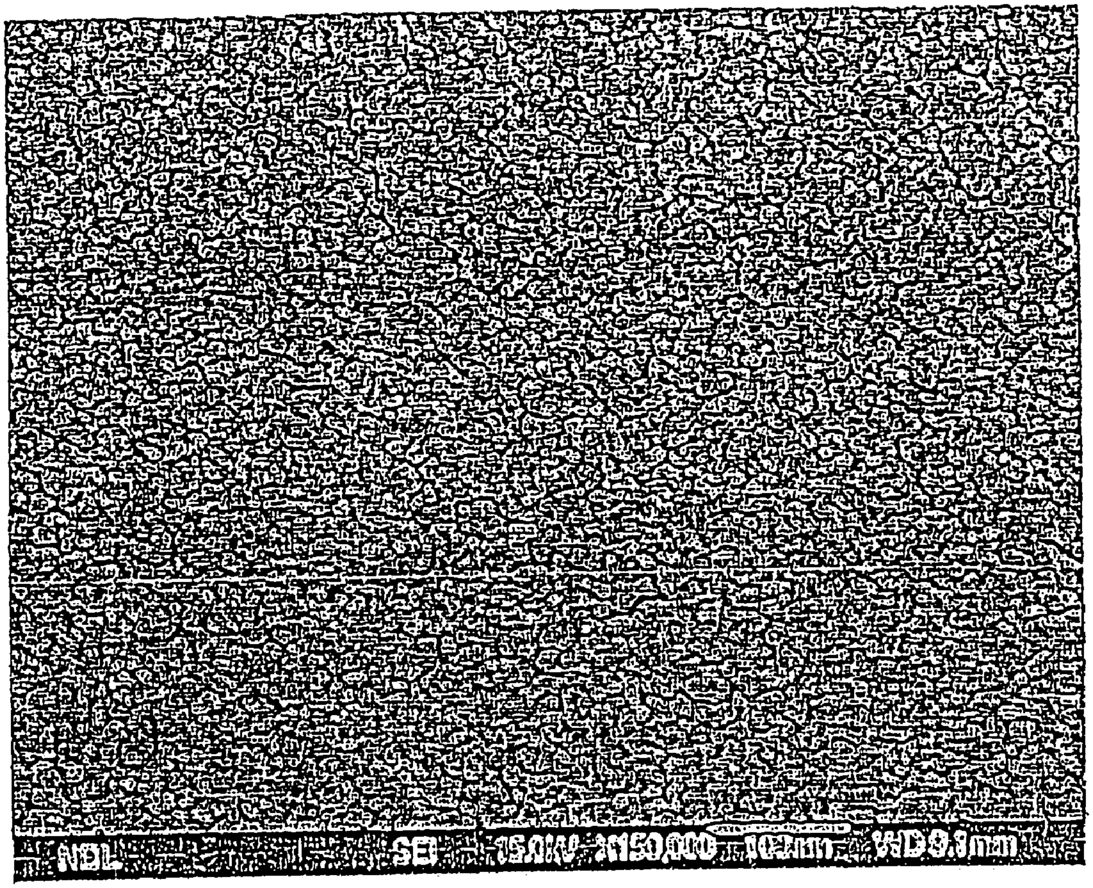
FIG. 2 presents the scanning electronic microscope (SEM) image of the titania sol-gel deposited thin film.

FIG. 1 displays the UV absorption spectrum of the titania sol-gel-deposited thin film on a glass slide. The absorbance of the titania thin film at a wavelength of 337 nm is ca. $3.6\times10^{6}$ $m^{-1}$, which suggests that the thin film can be employed directly as an assisting material in MOALDI MS analysis. FIG. 2 presents SEM images of the titania sol-gel-deposited thin films. A mesoporous morphology for the titania film with pore sizes of ca. 10 nm is observed. The nanocrystalline titania was evenly distributed on the film.

Preparation of Citric Buffer C1

The addition of citric buffer to MOALDI analysis renders the protonation of analytes and reduces the alkali cation adducts of analytes. The citric buffer was prepared by mixing diammonium hydrogen citrate and citric acid solution at a ratio of diammonium hydrogen citrate (50 mM)/citric acid (100 mM)=3/1 (v/v) with the pH value at 4.

Preparation of Citric Buffer C2

The citric buffer was prepared by mixing diammonium hydrogen citrate and citric acid solution at a ratio of diammonium hydrogen citrate (200 mM)/citric acid (200 mM)=5/1.1 (v/v) to have a pH value at 4.5.

EMBODIMENT 1

Figure 3:
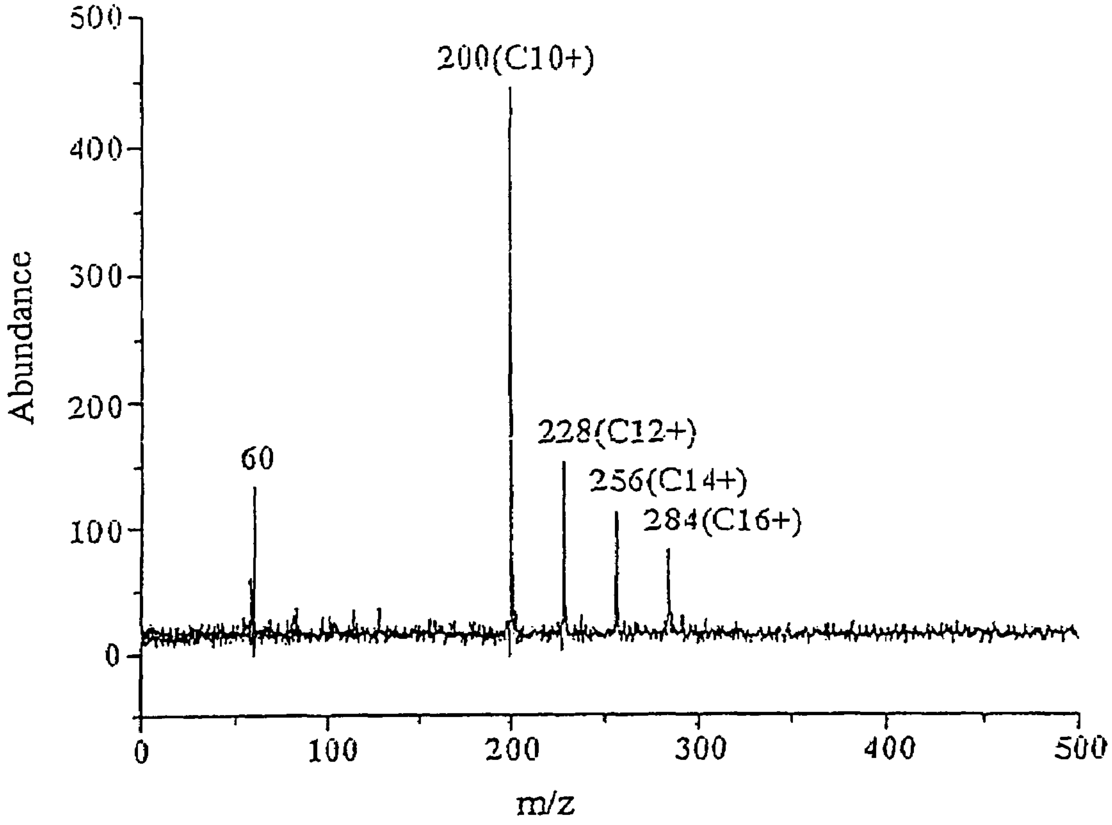
FIG. 3 presents MOALDI mass spectrum of a mixture of hexadecyltrimethylammonium bromide ($C16^+$, 68 fmol), tetradecyltrimethylammonium bromide ($C14^+$, 74 fmol), dodecyltrimethylammonium bromide ($C12^+$, 80 fmol), and decyltrimethylammonium bromide ($C10^+$, 90 fmol) using titania thin film as the assisting substrate. The details are described in Embodiment 1.

Small organics such as cationic surfactants were used as the sample to demonstrate the matrix background in the low mass region. FIG. 3 displays the MOALDI mass spectrum of a mixture containing four cationic surfactants with different carbon chain length, i.e. hexadecyltrimethylammonium bromide ($C16^+$, 68 fmol), tetradecyltrimethylammonium bromide ($C14^+$, 74 fmol), dodecyltrimethylammonium bromide ($C12^+$, 80 fmol) and decyltrimethylammonium bromide ($C10^+$, 90 fmol) using titania film as the assisting material. The peaks at mlz 200, 228, 256, and 284 correspond to the $C10^+$, $C12^+$, $C14^+$, and $C16^+$ ions, respectively, each without its bromide counterion. In addition to these precharged ions, a peak corresponding to the $NH(CH_3)_3^+$ ion, arising from fragmentation of the cationic surfactants, appears in the lower-mass region at mlz 60. No background ions arising from the titania matrix appear in this mass spectrum.

EMBODIMENT 2

Cationic surfactants are pre-charged ions, and no proton source is required. However, analytes such as peptides require proton sources for protonation. Citric buffer solution (C1) was prepared based on the preparation procedures as that displayed in Example 1. Sample D2 solution was prepared by mixing equal volume of bradykinin ($9.4\times10^{6}$ M) mixed with citric buffer C1.

Figure 4:
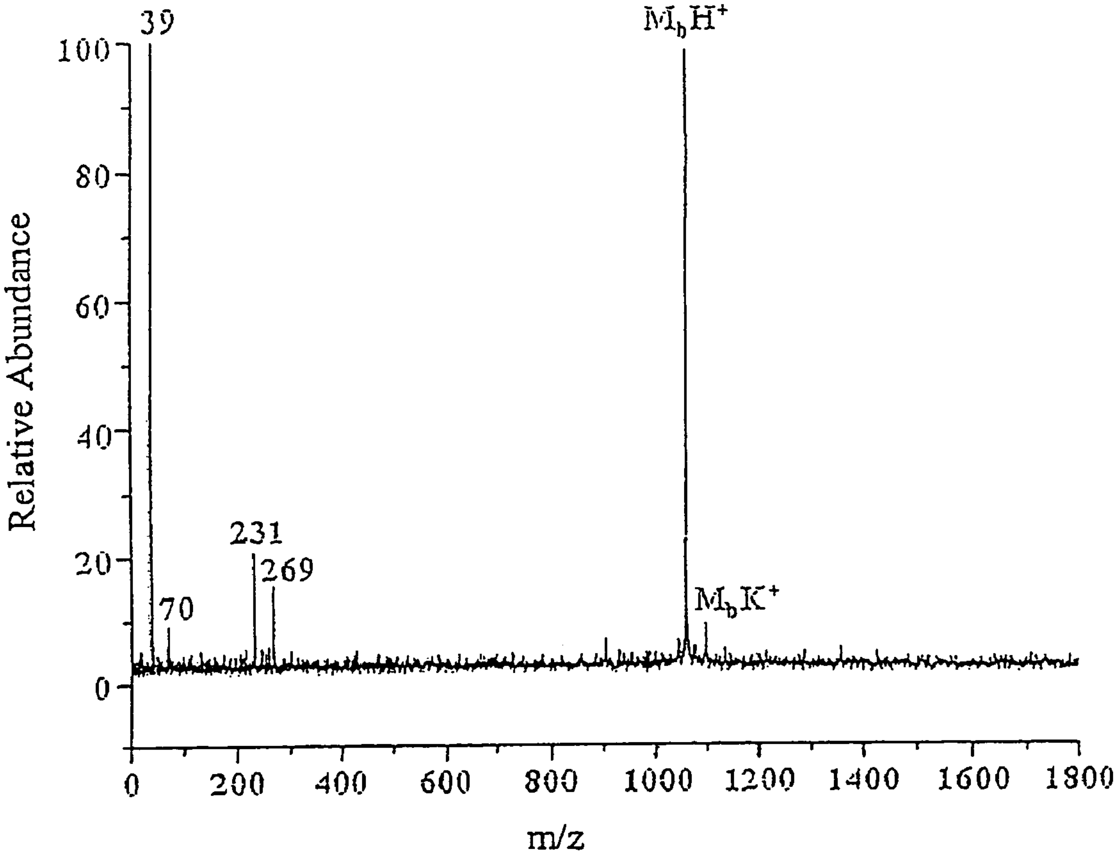
FIG. 4 presents the MOALDI mass spectrum of bradykinin using titania film as the assisting material. The details are described in Embodiment 2.

A titania film coating on an aluminum sheet as that prepared Example 1 was adhered onto a sample target using doublesided carbon tape. Sample D2 (0.2 μL) was applied on the surface of the titania film. After the solution evaporated, the sample target was introduced into the mass spectrometer for MOALDI MS analysis. FIG. 4 displays the MOALDI mass spectrum of sample D2. The protonated bradykinin pseudomolecular ions dominate the mass spectrum. The peaks at m/z 39, 70, 231, and 269 correspond to $K^+$ and $Al_2O^+$ ions and to potassium adducts of citric acid ($[M+K^+]^+$ and $[M-H^++2K^+]^+$), respectively. The $Al_2O^+$ signal may come from after the ablation of titania layer. A weak signal corresponding to the potassium adduct of bradykinin ($[M_b+K^+]^+$) appears adjacent to the $MH^+$ peak for bradykinin.

EMBODIMENT 3

For higher molecular weights of analytes such as proteins, higher concentrations of citric buffer are required for obtaining the optimum ion intensity in MOALDI MS analysis. For example, when insulin is analyzed, citric buffer C2 is used for providing the proton source in MOALDI MS analysis. Sample D3 is prepared by mixing equal volume of insulin ($8.7\times10^{-5}$ M) with citric buffer C2. Sample D3 (0.2 μL) was applied on the surface of the titania film. After the solution evaporated, the sample target was introduced into the mass spectrometer for MOALDI MS analysis.

Figure 5:
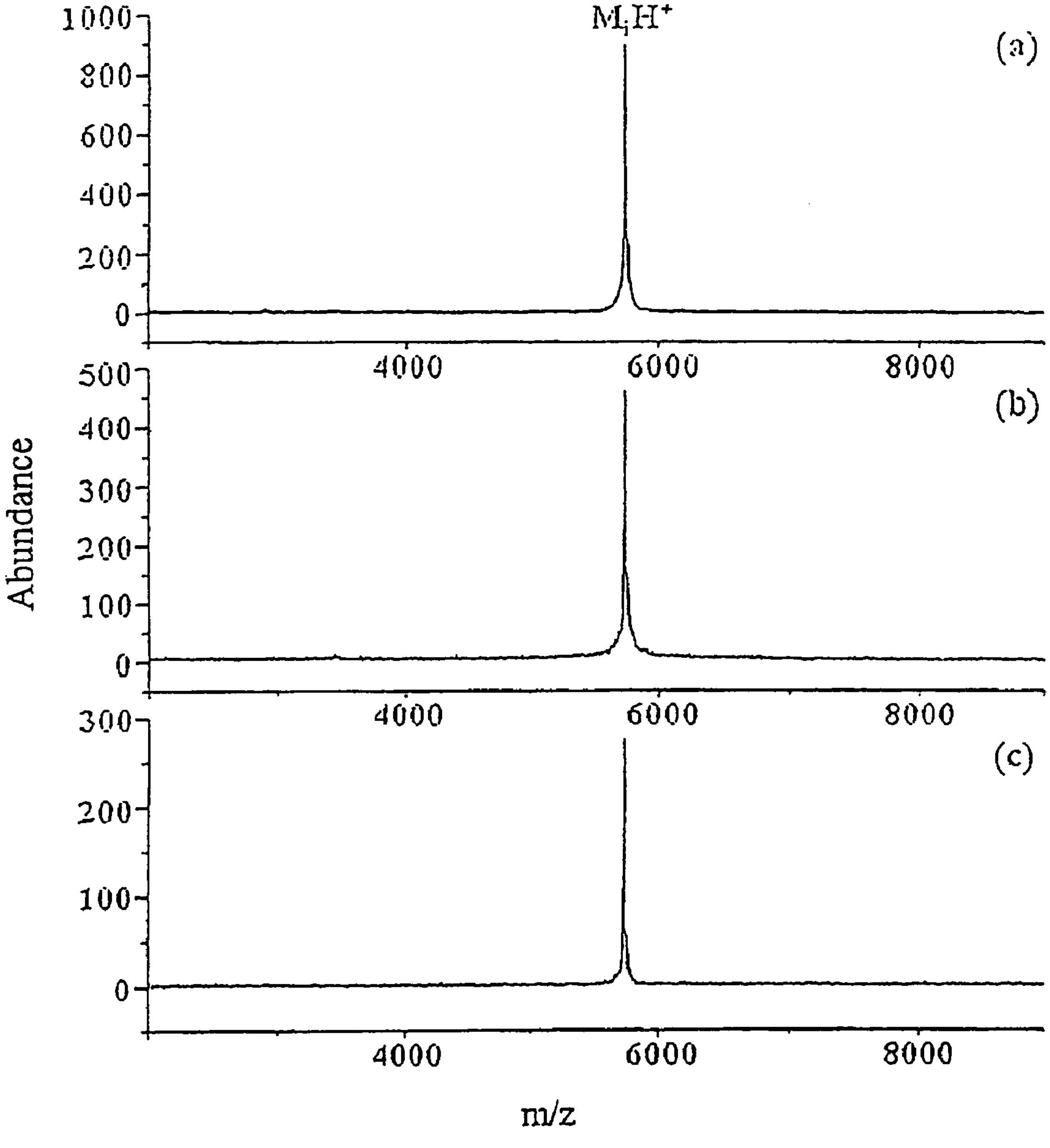
FIG. 5 presents the MOALDI mass spectrum of insulin using titania film as the assisting material. The details are described in Embodiment 3.

Furthermore, the stability of the titania film coating on the aluminum was examined. FIGS. 5*a–c* display the MOALDI mass spectra of insulin (8.7 pmol) obtained on the first, fifteenth, and thirtieth days, respectively, after the titania chips were prepared. The $MH_t^+$ ions obtained using either the 15- or 30-day-old titania chips have intensities similar to that obtained using the freshly prepared chip. The mass spectral quality of analyte signals for molecules of mass less than 5000 Da was unaffected by the freshness of the titania chips.

EMBODIMENT 4

Figure 6:
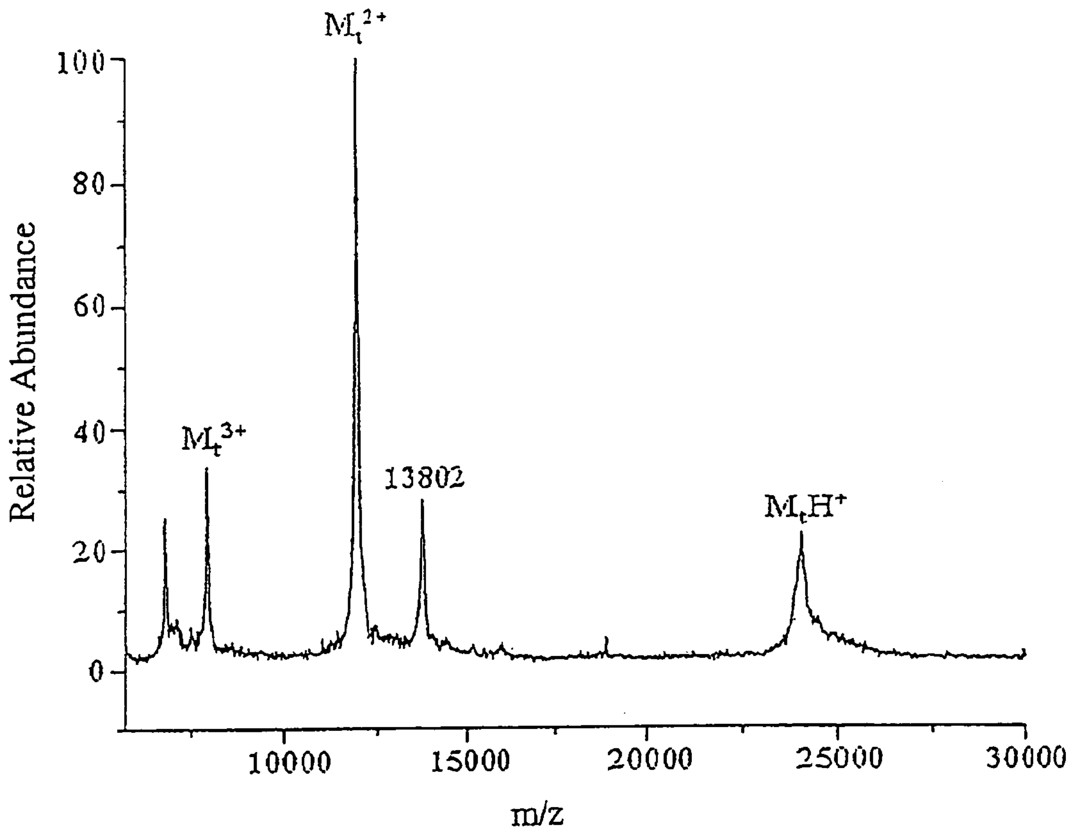
FIG. 6 presents the MOALDI mass spectrum of trypsinogen using titania film as the assisting material. The details are described in Embodiment 4.

Sample D4 was prepared by mixing equal volume of trypsinogen ($8.5\times10^{-5}$ M) with citric buffer C2. Sample D4 (0.2 μL) was applied on the surface of the titania film. After the solution evaporated, the sample target was introduced into the mass spectrometer for MOALDI MS analysis. FIG. 6 display the MOALDI mass spectrum of sample D4 using titania film as the assisting material. It is the largest molecule detected in MOALDI MS by using titania film as the assisting material. In addition to the peak for the singly charged ion ($M_tH^+$), the doubly $(M_t+2H)^{2+}$ and triply charged $(M_t+3H)^{3+}$ ions of trypsinogen are also observed in this mass spectrum. Trypsinogen is a proenzyme of trypsin; two other peaks observed at ca. m/z 13,802 and 6901 presumably correspond to the singly charged and doubly charged ions of an autolysis product of trypsinogen.

EMBODIMENT 5

Figure 7:
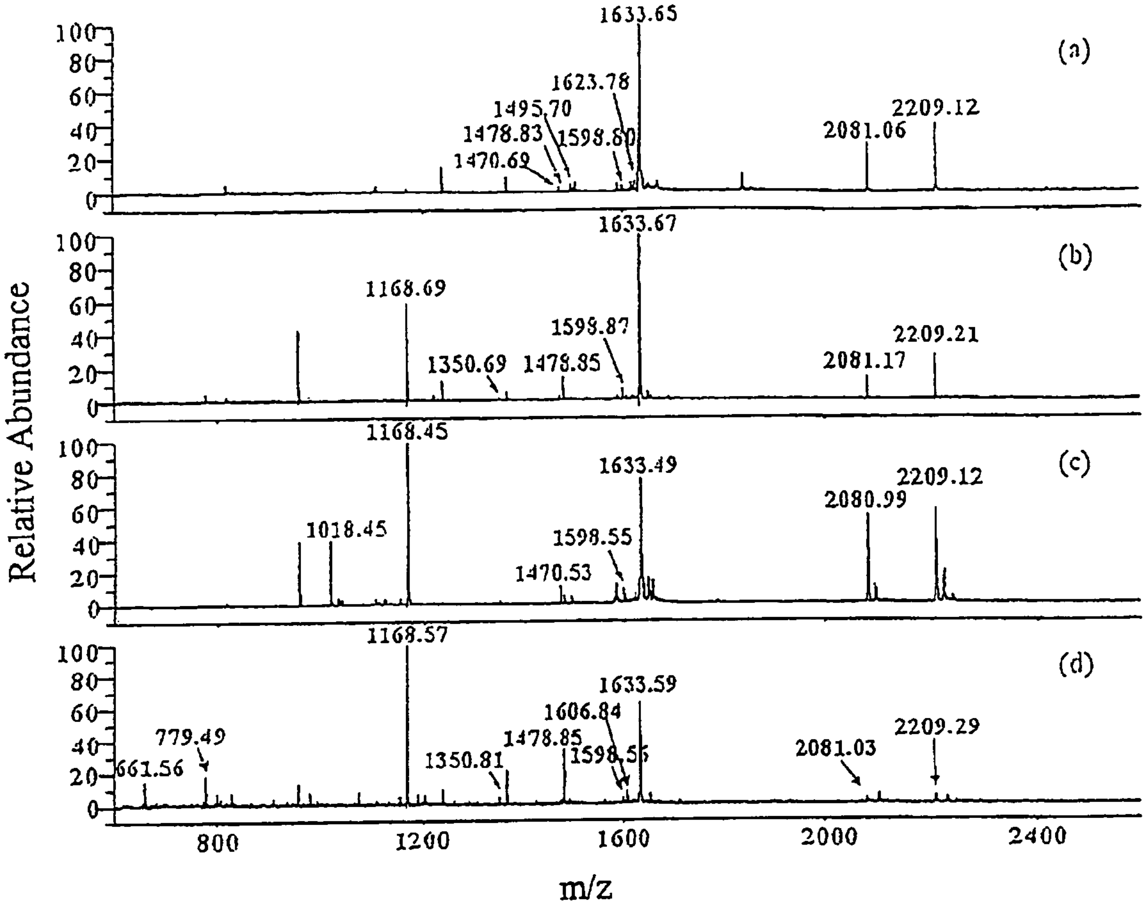
FIG. 7 presents the MOALDI mass spectrum of tryptic digest product of cytochrome C. The details are described in Embodiment 5.

Sample D5 was prepared by mixing the tryptic digest product of cytochrome C ($10^{-5}$ M) with equal volume of citric buffer C2. Sample D5 (0.2 μL) was applied on the surface of the titania film. After the solution evaporated, the sample target was introduced into the mass spectrometer for MOALDI MS analysis. FIGS. 7*a–d* present the MALDI mass spectra of the tryptic digest of cytochrome C ($10^{-5}$ M) using SA, CHCA, 2,5-DHB, and titania film as the matrices, respectively. There are more ion peaks observed in FIG. 7*d* than in FIGS. 7*a*, 7*b* and 7*c*, suggesting that use of titania film as the assisting material in MALDI analysis involves less ion suppression effects than in conventional MALDI analysis. However, the signal to noise ratios in FIGS. 7*a*–7*c* are appreciably better than that in FIG. 7*d*. By protein database search we identified the peaks at m/z 779.50, 907.71, 964.48, 1168.57, 1350.81, 1478.85, 1598.56, 1606.84, 1633.59, 2081.03, and 2209.29 in FIG. 7*d* as tryptic peptides of cytochrome C. The results indicate that this approach is suitable for the analysis of proteomic samples.

We claim:

1. Metal oxide-assisted laser desorption/ionization mass spectrometry comprising the steps of:

(a) providing metal oxide materials with light absorbing capability as the assisting material; and (b) using citric buffer as the proton source.

2. The metal oxide-assisted laser desorption/ionization mass spectrometry as described in claim 1, wherein the laser for irradiation having the wavelengths from ultraviolet to infrared range.

3. The metal oxide-assisted laser desorption/ionization mass spectrometry as described in claim 1, which is organic matrix-free and the addition of matrices is not required.

4. The metal oxide-assisted laser desorption/ionization mass spectrometry as described in claim 1, which is conducted directly with matrix-assisted laser desorption/ionization mass spectrometer (MALDI-MS).

5. The metal oxide-assisted laser desorption/ionization mass spectrometry as described in claim 1, wherein the laser with the energy higher than that need in the traditional matrix-assisted laser desorption/ionization mass spectrometry is used.

6. The metal oxide-assisted laser desorption/ionization mass spectrometry as described in claim 1, wherein the mass spectrometry is conducted directly after mixing a sample and a citric buffer solution.

7. The metal oxide-assisted laser desorption/ionization mass spectrometry as described in claim 1, wherein the metal oxide still has the capability of assisting desorption/ionization for analytes even after modification or improvement of its surface.

8. The metal oxide-assisted laser desorption/ionization mass spectrometry as described in claim 1, wherein the metal oxide can be fabricated as either films or nanoparticles.

* * * * *